United States Patent [19] [11] 4,034,382
Law [45] July 5, 1977

[54] APPARATUS FOR FORMING A COLOR TELEVISION PICTURE TUBE SCREEN

[75] Inventor: Harold Bell Law, Princeton, N.J.
[73] Assignee: RCA Corporation, New York, N.Y.

[22] Filed: Aug. 25, 1975
[21] Appl. No.: 607,488

Related U.S. Application Data

[62] Division of Ser. No. 217,885, Jan. 14, 1972.

[52] U.S. Cl. .................... 354/1
[51] Int. Cl.² .................... G03B 41/00
[58] Field of Search .................... 354/1; 96/36.1

[56] References Cited

UNITED STATES PATENTS

| | | | |
|---|---|---|---|
| 3,587,417 | 6/1971 | Balder et al. | 354/1 |
| 3,633,058 | 1/1972 | Kouno | 313/406 |
| 3,652,895 | 3/1972 | Tsuneta et al. | 313/403 |
| 3,735,677 | 5/1973 | Jones et al. | 354/1 |

*Primary Examiner*—John Gonzales
*Attorney, Agent, or Firm*—Glenn H. Bruestle; Dennis H. Irlbeck

[57] ABSTRACT

A substantially continuous line screen structure pattern is formed in a color television picture tube having an interrupted-aperture shadow mask by applying a photosensitive material to a screen support and projecting light from an extended source through the shadow mask apertures and onto the coated screen support. In a preferred embodiment, the line screen is formed by projecting light from a line source through a shadow mask having a plurality of rows of elongated apertures and onto the coated screen support.

6 Claims, 5 Drawing Figures

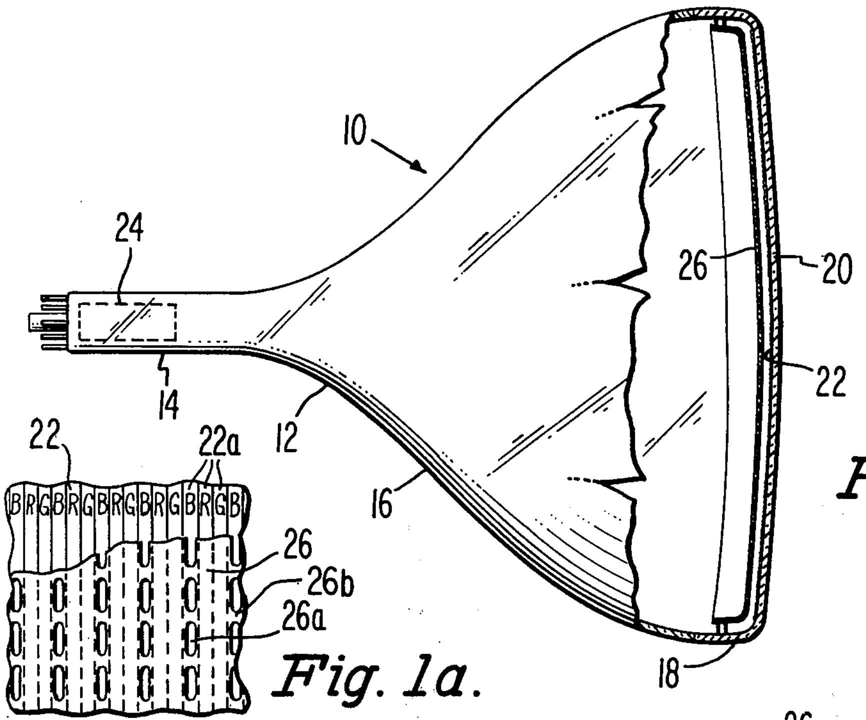
Fig. 1.
Fig. 1a.
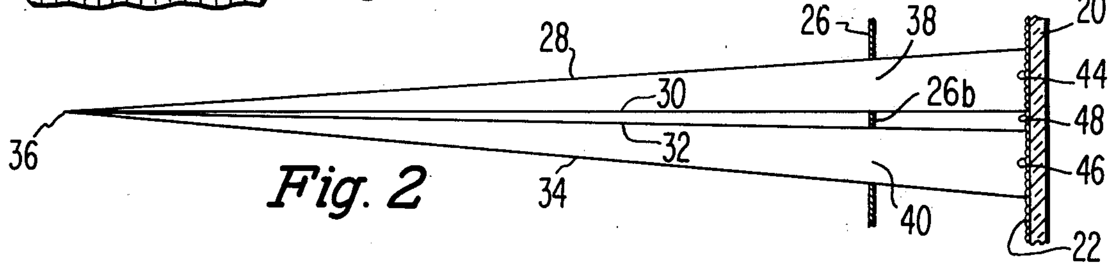
Fig. 2
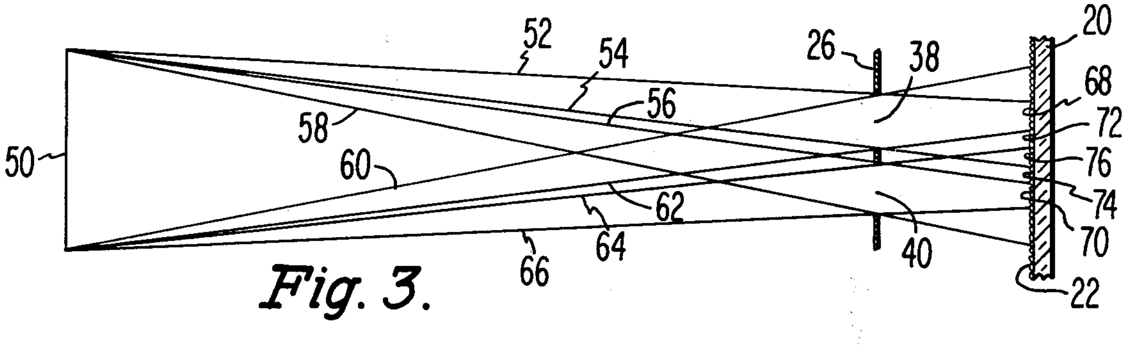
Fig. 3.
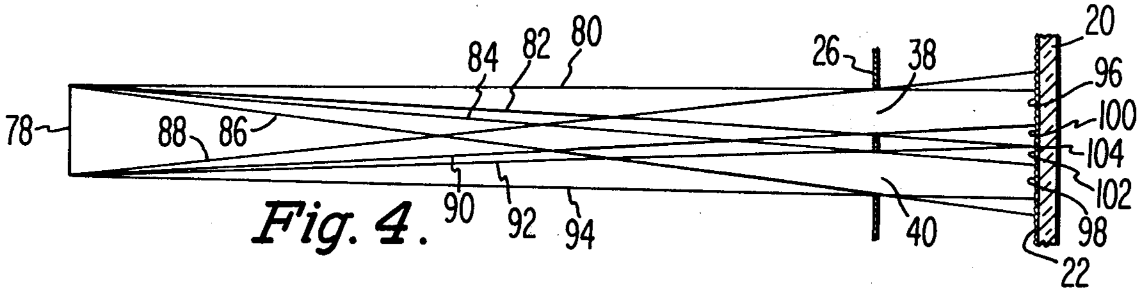
Fig. 4.

APPARATUS FOR FORMING A COLOR TELEVISION PICTURE TUBE SCREEN

This is a division of application Ser. No. 217,885 filed Jan. 14, 1972.

BACKGROUND OF THE INVENTION

This invention relates to the manufacture of shadow mask type color television picture tubes. More particularly, it relates to a method for forming a substantially continuous line screen in a color television picture tube having an interrupted-aperture shadow mask.

Shadow mask picture tubes usually include a screen of red, green and blue emitting phosphor lines or dots, electron gun means for exciting the screen and a shadow mask interposed between the gun means and the screen. The shadow mask is a thin multiapertured sheet of metal precisely disposed adjacent the screen so that the mask apertures are systematically related to the phosphor lines or dots.

In one prior art process for forming each color array of phosphor lines or dots on a viewing faceplate within the tube, the inner surface of the faceplate is coated with a mixture of phosphur particles adapted to emit light of one of the three colors, e.g., blue, and a photosensitive binder. A light field is projected from a point source through the shadow mask apertures and onto the coating so that the shadow mask functions as a photographic master. The exposed coating is subsequently developed to produce phosphor elements of the first phosphor; e.g., blue emitting lines or dots. The process is repeated for the green-emitting phosphor and for the red-emitting phosphor utilizing the same shadow mask but repositioning the point source of light for each exposure. A more complete description of a prior art process for forming a picture tube screen can be found in U.S. Pat. No. 2,625,734 issued to me on Jan. 20, 1953.

When the foregoing screen printing process is utilized with a shadow mask having a plurality of rows of apertures, wherein the apertures in each row are separated by webs, to form a line screen, each line of a particular phosphor color becomes a series of spaced dashes on the tube faceplate because of the shadowing effect of the webs. The length, $h$, of each phosphor dash is determined by the following equation wherein: $L$ is the distance from the point source to the screen; $q$ is the distance from the shadow mask to the screen; and $B$ is the length of an associated shadow mask slit.

$$h = B\ (L/L-q)$$

If the electron beam emitted by the electron gun followed the same path as the light used to form the phosphor lines, the length of a phosphor dash, as given by the preceeding equation, would be adequate for attaining optimum picture brightness from this type of tube. However, the electron beam in a picture tube does not follow the path of the light used in the screen printing process. Instead, as known in the art, during beam deflection away from the central axis of the tube, the effective beam-deflection center moves toward the screen as deflection is increased. This effective shift of the deflection plane results in the electron beam passing through the shadow mask and striking the screen at a slightly different angle than did the light that was used to produce the screen. Therefore, portions of the electron beam will not land on the phosphor dashes produced by the preceding process but instead will land on the shadowed areas lying in between the dashes of one row. Since it is desirable to maximize tube brightness, the nonuse or loss of the electrons that do not strike the phosphor dashes is unacceptable.

Therefore, to attain increased tube brightness, while maintaining the advantage of accurate registry between apertures and lines that occurs when the shadow mask is used as a photographic master for line formation, it is necessary to either extend the length of each phosphor dash into the area between dashes of each row or, preferably, to form continuous phosphor lines.

SUMMARY OF THE INVENTION

The present invention provides a method for forming a line screen structure in a color television picture tube having a shadow mask spaced from a line screen thereof, wherein the shadow mask has a plurality of rows of apertures and the apertures in each row are separated by webs. A coating comprising a photosensitive material is applied to a screen support and light is projected along at least two paths from spaced apart points through the apertures of the shadow mask and onto the photosensitive coating. A line interconnecting the spaced apart points is substantially parallel to the desired direction of lines.

BRIEF DESCRIPTION OF THE DRAWINGS

FIG. 1 is a partially broken away elevational view of a shadow mask picture tube.

FIG. 1*a* is an enlarged fragmentary rear elevational view of a portion of the mask and screen of FIG. 1.

FIG. 2 is a diagrammatic view of light being projected from a point source through a shadow mask and onto a photosensitive surface.

FIGS. 3 and 4 are diagrammatic views of light being projected from a line source through a shadow mask and onto a photosensitive surface.

DETAILED DESCRIPTION OF THE PREFERRED EMBODIMENTS

FIG. 1 depicts a color television picture tube 10 comprising an evacuated glass envelope 12 formed with a small neck portion 14, an intermediate funnel portion 16 and an end cap 18 comprising a curved screen support or viewing faceplate 20. The inside surface of the faceplate 20 is covered with a color phosphor screen 22 comprising an alternate line pattern of red, green and blue emitting phosphors. An opaque shadow mask 26 having a plurality of substantially parallel rows of elongated apertures separated by webs is mounted within the end cap 18 in spaced relationship to the screen 22. This shadow mask and the line screen pattern are shown in greater detail in the fragmentary view of FIG. 1*a* wherein the screen lines and the apertures are designated 22*a* and 26*a*, respectively, and the webs are designated 26*b*. An electron gun 24 is positioned in the neck portion 16 to project an electron beam through the shadow mask 26 and onto the screen 22 thereby exciting the phosphor lines. The electron beams are caused to systematically scan the screen by external deflection means (not shown) located in the vicinity of the junction of the neck and the funnel so that the desired picture information is obtained when the screen 22 is viewed through the faceplate 20.

In the construction of the foregoing picture tube 10, the end cap 18 is fabricated separately from the neck portion 14 and the funnel portion 16. The end cap 18 is joined to these portions only after the screen 22 has been applied to the faceplate 20 and the shadow mask 26 has been finally mounted adjacent the screen.

Generally, the screen 22 is formed in at least three stages wherein one stage is required to form the array of lines for each particular color. Each of these stages begins with the step of coating the interior surface of the faceplate 20 with a photosensitive material including a binder. Thereafter, the shadow mask 26 is mounted in the end cap 18 adjacent to the faceplate 20 and the end can is positioned on a lighthouse (not shown). Next, the photosensitive material is exposed by projecting light through the shadow mask apertures onto the photosensitive material, thereby hardening the exposed portions of the photosensitive material that are to become the line array of a particular color. After exposure, the unhardened, unexposed photosensitive material is removed by a suitable developing (washing) technique. In the foregoing procedure, the shadow mask that is to be used in the completed picture tube is utilized as a photographic master in exposing the photosensitive material. It has been found that the most accurate registry between the shadow mask apertures and the phosphor lines can be attained by the foregoing procedure where the final tube shadow mask is used as a master.

If the shadow mask apertures were continuous slits extending vertically across the mask, the utilization of a point source of light to expose the photosensitive material would produce a screen pattern of continuous parallel lines. However, as shown in FIG. 2, if the shadow mask apertures 38 and 40 are interrupted or separated by a web **26*b***, the resulting screen pattern will comprise dashed parallel lines.

In FIG. 2, lines 28, 30, 32 and 34 depict four light rays projected from a point light source 36. Lines 28 and 30 are two of the extreme boundary light rays that will just pass through the upper aperture 38 in the shadow mask 26. Similarly, lines 32 and 34 are two boundary light rays that just pass through the lower aperture 40. The two apertures 38 and 40 are vertically separated by an opaque web **26*b* that is an integral portion of mask 26. Two areas 44 and 46 on the faceplate 20 determined by the lines 28 and 30 and 32 and 34, respectively, are uniformly exposed to the light from the point source 36 whereas the shadowed faceplate area 48 directly behind the web 26*b*** remains unexposed.

If the electron beams in a picture tube followed the same path as do the light rays in FIG. 2, a printing method using a point source would be sufficient to produce a tube having the maximum brightness possible. However, electron beams in picture tubes do not follow the path of light used in the screen printing process but rather approach the screen at a slightly different angle. This variation between the path of the exposure light and the path of the electron beams is well known in the art. The result of the variation is that a portion of the electron in the electron beam strike an area of faceplate 20 outside of the exposed areas 44 and 46. For example, some of the electrons would strike the umbra of web **26*b* or unexposed area 48. Since the area 48 will not contain any light emitting phosphors, any electrons striking this area will be wasted and will not contribute to the visual light output of the picture tube. Increased picture tube efficiency and increased tube brightness can be obtained by utilizing the electrons that strike the area 48. Such utilization can be accomplished by extending the phosphor areas 44 and 46 into the shadowed area 48.**

In the present invention, such extension of the phosphor areas is accomplished during photographic printing of the screen by spreading the light source. FIG. 3 shows a preferred embodiment having an extended light source. In this figure, a line source of light 50, such as a suitably masked mercury arc lamp, projects light through the apertures 38 and 40 of the mask 26 and onto the coated faceplate 20. For simplification, only the light rays from the extreme end points of the line source 50 that just pass through the apertures are shown. Lines 52 and 54 and lines 56 and 58 are the light rays emitted from the upper edge of the source 50 that just pass through apertures 38 and 40, respectively. Similarly, lines 60 and 62 and lines 64 and 66 are the light rays from the lowest point of the source 50 that just pass through apertures 38 and 40, respectively. The projection of light onto the coated faceplate 20 produces several areas of different light exposures. The areas designated by numerals 68 and 70 receive full light exposure from the entire length of the light source 50. A penumbra region, however, exists on each side of these maximum exposure areas 68 and 70. By utilization a light source of sufficient length, the penumbra formed by light emitted from one end portion of the source through an aperture can be made to overlay the penumbra formed by light emitted from the other end portion of the source through an adjacent aperture. The light intensity in the areas 72 and 74 that are adjacent to the areas 68 and 70, respectively, linearly decreases as the distance from the areas 68 and 70 increases. In an overlap area 76, however, the light intensity contributions from each end portion of the light source are additive and therefore provide a somewhat uniform level of light intensity. If this level of intensity in the area 76 is sufficient to reach a minimum exposure level required for complete development of the photosensitive coating, the foregoing light exposure method will produce a continuous line pattern for the phosphor screen. Since the level of light intensity at the area 76 is dependent on the length of the light source, the length of the source could be varied to meet any particular minimum exposure requirements if the exposure time were fixed.

FIG. 4 shows one of many other embodiments that are possible within the scope of the present invention. In this FIGURE, lines 80 and 82 and 84 and 86 depict the extreme boundary light rays from the upper end point of a line light source 78 that just pass through the apertures 38 and 40, respectively. Similarly, lines 88 and 90 and 92 and 94 dipict the boundary light rays from the lowest end point of the source 78. In this case, the light intensity at the coated faceplate 20 is a maximum throughout the areas 96 and 98 and diminishes linearly through penumbra areas 100 and 102 to a point 104 of zero intensity. This arrangement would produce a continuous line screen pattern having greater variations of exposure intensity than the arrangement of FIG. 3.

EXAMPLE

The foregoing method may be used with a standard lighthouse, known to the art, such as that shown in U.S. Pat. No. 3,592,112, issued to Frey on July 13, 1971, that has been modified to produce a line source rather than a point source of light. One example of a high pressure mercury arc lamp that may be used in such line source is manufactured by General Electric and designated B-H6. The light from this arc may be restricted, such as by masking close to the arc or preferably by directing it through a collimator having a thin extended tip, to obtain the desired light source length.

Following fabrication of the end cap 18 by known techniques, the interior surface of the faceplate is coated with a suitable photosensitive material that also includes a binder. Next, the shadow mask is mounted in the end cap and the end cap is positioned on the lighthouse. In a preferred embodiment, the shadow mask is constructed from a formed thin metal sheet having a plurality of rows of elongated apertures wherein the apertures in each row are separated by webs. Thereafter, the coated surface of the faceplate 20 is exposed by a line light source as shown in FIG. 3; to harden the line portions of the coating. After exposure, the mask is removed and the photosensitive material is developed to remove the unhardened unexposed portions and to obtain a desired continuous line pattern for phosphor lines of a particular color, such as blue. In first order printing, the location of the line light source in the lighthous should be in what is known as the deflection plane of the tube and at the center of deflection of the electron beam involved. The scope of the invention, however, is not limited to either first or second order printing techniques, and may also be used with or without a correction lens. Such a correction lens, if used, should provide correction for misregister in the horizontal direction, normal to the phosphor lines. With the present invention, no correction for misregister in the vertical direction need be provided.

Once the line pattern for a first color emitting phosphor line array is established, the method may be repeated as often as needed to obtain the line patterns for other color emitting phosphor line arrays. A different light source position should be used for each different color phosphor line array to be formed. Preferably, these other light sources should also be located at the center of deflection of the electron beam for the particular color involved, in first order printing. After all the line arrays have been established, the picture tube may be completed by known techniques.

I claim:

1. A light exposure apparatus for the formation of a striped phosphor screen on the panel portion of a color picture tube including a striped color selective electrode having a plurality of slits comprising:

a light source assembly including a light emitter, a reflector and a collimating member;

a base for supporting the panel portion of a color picture tube and the striped color selective electrode with the plurality of slits in a predetermined positional relationship with respect to said light source assembly; and a correction lens disposed between said light source assembly and said base for causing paths of light from said light source assembly to approximate paths of electron beams in the color picture tube, said collimating member having a light emitting portion facing said base and said correction lens; said light emitting portion of said collimatng member being shaped substantially in a linear form as viewed from said base so that said light source assembly serves as a linear light source, and being oriented such that the length of said linear light emitting portion is in the direction of the length of the slits in the striped color selective electrode.

2. The light exposure apparatus as defined in claim 1, wherein said collimating member is a single collimator.

3. The light exposure apparatus as defined in claim 2, wherein said single collimator has a plurality of light emitting portions which in combination form said linear light source.

4. A light exposure apparatus for the formation of a striped phosphor screen for a color picture tube, comprising a mask having a plurality of aligned slits therein, light beam generating means facing said mask for projecting light through said aligned slits, and lens means disposed between said light beam generating means and said mask for causing the paths of light from said light beam generating means to approximate the paths of electron beams in a color picture tube, said light beam generating means including a light emitter and a collimating member having a light receiving portion disposed adjacent said light emitter and a light emitting portion facing said lens means and said mask, the light emitting portion of said collimating member having a plurality of light emitting points disposed along a common line so that said light beam generating means serves as a linear light source, said collimating member being oriented with said light emitting points disposed in alignment with the direction of the length of said slits in said mask.

5. A light exposure apparatus as defined in claim 4, wherein said light emitting portion of said collimating member is a continuous linear light emitting surface.

6. A light exposure apparatus as defined in claim 4, wherein said light emitting portion of said collimating member comprises a pair of circular light emitting surfaces spaced along said common line.

* * * * *